(12) United States Patent
Fan (10) Patent No.: US 8,792,711 B2
(45) Date of Patent: Jul. 29, 2014

(54) SYSTEM AND METHOD OF FOREGROUND-BACKGROUND SEGMENTATION OF DIGITIZED IMAGES

(75) Inventor: Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 13/511,806

(22) PCT Filed: Dec. 2, 2009

(86) PCT No.: PCT/US2009/066398
§ 371 (c)(1),
(2), (4) Date: May 24, 2012

(87) PCT Pub. No.: WO2011/068508
PCT Pub. Date: Jun. 9, 2011

(65) Prior Publication Data
US 2012/0275694 A1 Nov. 1, 2012

(51) Int. Cl.
*G06K 9/00* (2006.01)
*G06K 9/34* (2006.01)

(52) U.S. Cl.
USPC .......................................... 382/164; 382/173

(58) Field of Classification Search
None
See application file for complete search history.

(56) References Cited

U.S. PATENT DOCUMENTS

| | | | |
|---|---|---|---|
| 2001/0028737 A1* | 10/2001 | Takakura et al. | 382/162 |
| 2003/0198382 A1* | 10/2003 | Chen et al. | 382/173 |
| 2005/0213845 A1 | 9/2005 | Aavinash et al. | |
| 2006/0274381 A1* | 12/2006 | Simard et al. | 358/426.06 |
| 2007/0217701 A1* | 9/2007 | Liu et al. | 382/234 |
| 2008/0267497 A1* | 10/2008 | Fan | 382/173 |
| 2008/0310721 A1* | 12/2008 | Yang et al. | 382/182 |
| 2010/0098331 A1* | 4/2010 | Meng et al. | 382/164 |

FOREIGN PATENT DOCUMENTS

JP  2007-201611  8/2007

OTHER PUBLICATIONS

B. Gatos, I. Pratikakis and S.J. Perantonis, Adaptive degraded document image binarization .. , Pattern Recognition, vol. 39. No. 3, pp. 317-327, Mar. 2006.
Jian Fan, "Enhancement of camera-captured document images with watershed segmentation."CBDAR07 (2007), 87-93.
Shi, Zhixin, and Venu Govindaraju. "Historical document image enhancement using background light intensity normalization." Pattern Recognition, 2004. ICPR 2004. Proceedings of the 17th International Conference on. vol. 1. IEEE, 2004.

* cited by examiner

*Primary Examiner* — Li Liu (57) ABSTRACT

A system and method for segmenting foreground and background regions on a digitized image uses a computer, having a processor and system memory, to segment the image into initial regions and identify background regions from the initial regions. A complete background surface is estimated of the image, and pixels of the image are rectified with the estimated background surface to normalize the image. Normalized pixels are compared with a threshold color to determine a final segmentation of background regions.

11 Claims, 6 Drawing Sheets

FIG. 8

SYSTEM AND METHOD OF FOREGROUND-BACKGROUND SEGMENTATION OF DIGITIZED IMAGES

BACKGROUND

It is sometimes convenient to digitize documents with a digital handheld camera. However, document capture with digital cameras has many inherent limitations. For example, it is difficult to project uniform lighting onto a document surface, and this often results in uneven illumination and color shift in the acquired pages. Another issue common with documents digitized with handheld digital cameras is that the text is often unclear and blurry due to movement of the camera in the user's hands.

These types of conditions make camera captured documents difficult to analyze and transform into useful electronic formats. For example, blurry or unclear text makes optical character recognition difficult, if not impossible, for purposes of transforming the digitized image into a text editable document.

One approach to addressing this issue is segmentation, commonly referred to as binarization in the document image analysis community, of the foreground and background of the document. Segmentation of the foreground and background is usually the first step towards document image analysis and recognition. For well-scanned documents with text on uniform background, high quality segmentation can be achieved by global thresholding. However, for camera-captured document images, non-uniform lighting is commonplace and global thresholding methods often produce unacceptable results. Adaptive thresholding algorithms have been developed; however, such programs can have difficulty handling documents containing figures.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting. As used herein, the term "computer" refers to any type of computing device, including a personal computer, mainframe computer, portable computer, PDA, smart phone, or workstation computer that includes a processing unit, a system memory, and a system bus that couples the processing unit to the various components of the computer. The processing unit can include one or more processors, each of which can be in the form of any one of various commercially available processors. Generally, each processor receives instructions and data from a read-only memory (ROM) and/or a random access memory (RAM). The system memory typically includes ROM that stores a basic input/output system (BIOS) that contains start-up routines for the computer, and RAM for storing computer program instructions and data.

A computer typically also includes input devices for user interaction (e.g., entering commands or data, receiving or viewing results), such as a keyboard, a pointing device (e.g. a computer mouse), microphone, camera, or any other means of input known to be used with a computing device. The computer can also include output devices such as a monitor or display, projector, printer, audio speakers, or any other device known to be controllable by a computing device. In some embodiments, the computer can also include one or more graphics cards, each of which is capable of driving one or more display outputs that are synchronized to an internal or external clock source.

The term "computer program" is used herein to refer to machine-readable instructions, stored on tangible computer-readable storage media, for causing a computing device including a processor and system memory to perform a series of process steps that transform data and/or produce tangible results, such as a display indication or printed indicia.

The terms "computer-readable media" and "computer-readable storage media" as used herein includes any kind of memory or memory device, whether volatile or non-volatile, such as floppy disks, hard disks, CD-ROMs, flash memory, read-only memory, and random access memory, that is suitable to provide non-volatile or persistent storage for data, data structures and machine-executable instructions. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and optical disks, such as CD, CDROM, DVD-ROM, DVD-RAM, and DVD-RW. Any of the above types of computer-readable media or related devices can be associated with or included as part of a computer, and connected to the system bus by respective interfaces. Other computer-readable storage devices (e.g., magnetic tape drives, flash memory devices, and digital video disks) also can be used with the computer.

The exemplary embodiments described herein generally provide for a system and method for segmenting foreground and background for camera-captured document images. Initial color segmentation can be performed by applying a watershed transform to the noise-thresholded color gradient magnitude, with the threshold estimated from the histogram of the gradient magnitude. Significant background regions can be identified and interpolated to form an estimate of a complete background surface of the image. The estimated background surface can be used to normalize the original image, such that the background pixels become pure white and the lighting variation of the foreground is rectified. The final foreground and background segmentation can then be determined by comparing the normalized pixels to a threshold color computed from a Euclidian color distance based on normalized pixels.

Figure 1:
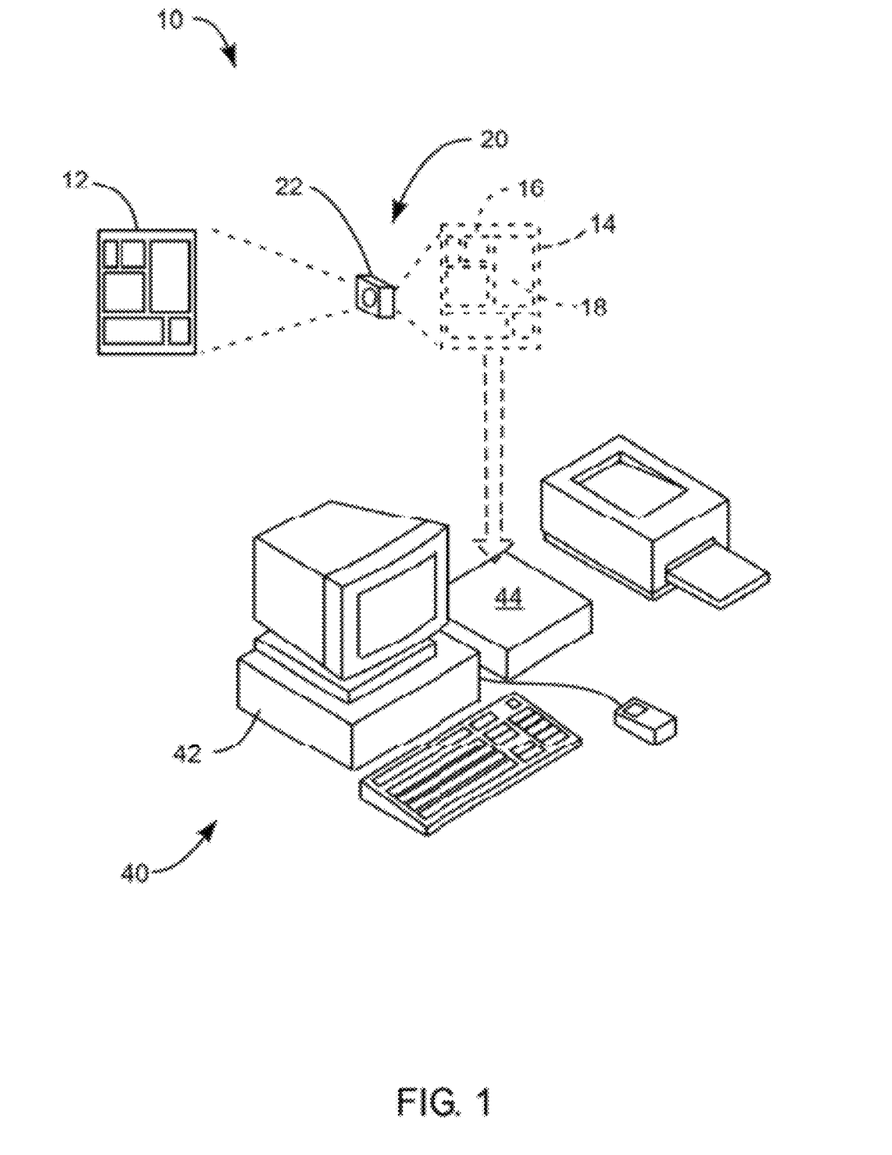
FIG. 1 is a schematic view of an embodiment of a system for segmenting foreground and background regions on a digitized image in accordance with the present disclosure.

Provided in FIG. 1 is a schematic of view of one embodiment of a system for segmenting foreground and background regions of a digitized image, indicated generally at 10. The system can include a digital duplicator, indicated generally at 20, a computer, indicated generally at 40, and a means for segmenting the digital image into foreground and background regions.

The digital duplicator 20 can digitally capture and reproduce a digital or digitized image 14 of an original hardcopy document 12. The digital duplicator can be a digital camera, a scanner, and the like. As shown in the embodiment in FIG. 1, the digital duplicator 20 can be a handheld digital camera 22. The camera 22 can take digital images of documents. The digitized images can be digital reproductions of the original documents. The digitized images can be sent from the camera to the computer 40 for processing.

Figure 2:
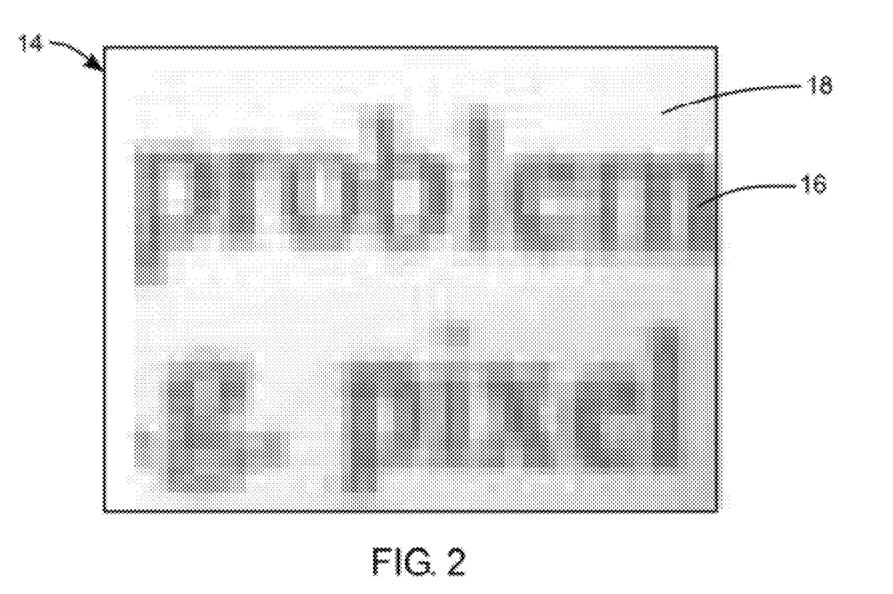
FIG. 2 is a view of a digitized image produced by a digital camera from the embodiment of a system for segmenting foreground and background regions on the digitized image of FIG. 1.

FIG. 2 shows an embodiment of a digitized image 14a produced by the digital camera 22. The image can include foreground regions 16a, such as text, graphics, photographic images, and the like, and background regions 18a.

Returning to FIG. 1, the computer 40 can be a microprocessor based computing device such as a desktop computer, as shown in FIG. 1, a laptop computer, a net book, a PDA, an internet server, an application server, and the like. The computer can include a processor 42 and a system memory 44, comprising tangible computer-readable storage media.

The processor 42 can be configured to receive, analyze and segment the digitized images 14 produced by the digital duplicator 20 described above. The processor 42 can include means, such as programming, for identifying and segmenting the digital image 14 into the foreground regions 16 and background regions 18. In one embodiment, the programming can segment the foreground and background regions of the digital image by normalizing the image with an estimated background surface, and comparing the normalized pixels with a threshold color to determine a final segmentation of background regions.

To normalize the image the program can first estimate the background surface of the digitized image 14. Estimating the background surface can be accomplished by segmenting the image into initial regions and identifying the background regions from the initial regions. The initial regions can be determined by downsizing and smoothing the image, determining a color gradient magnitude for the image, and applying a watershed transform to the color gradient magnitude.

Figure 3:
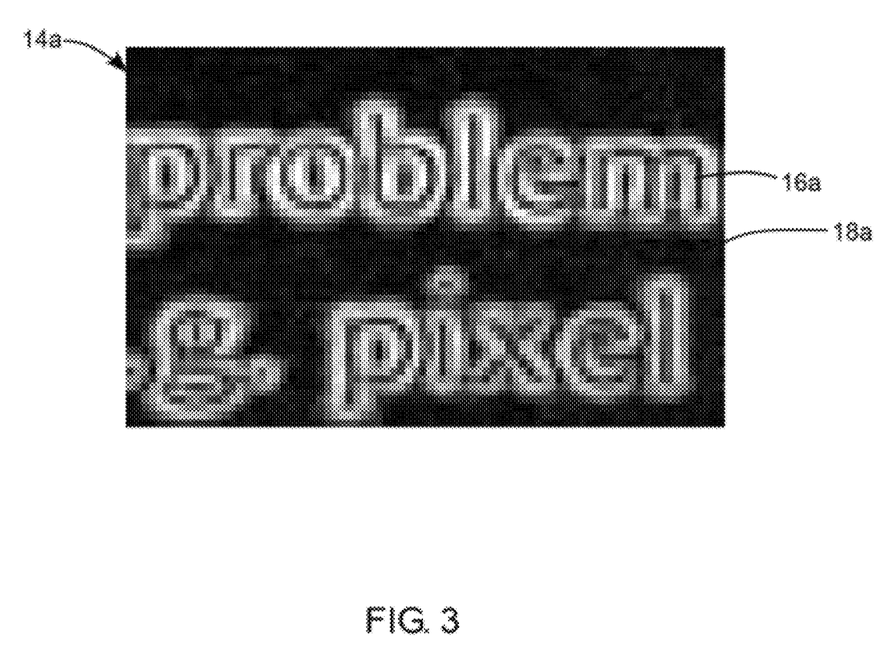
FIG. 3 is a view of a color gradient magnitude of the digitized image of FIG. 2 with foreground regions and background regions in accordance with the present disclosure.
Figure 4:
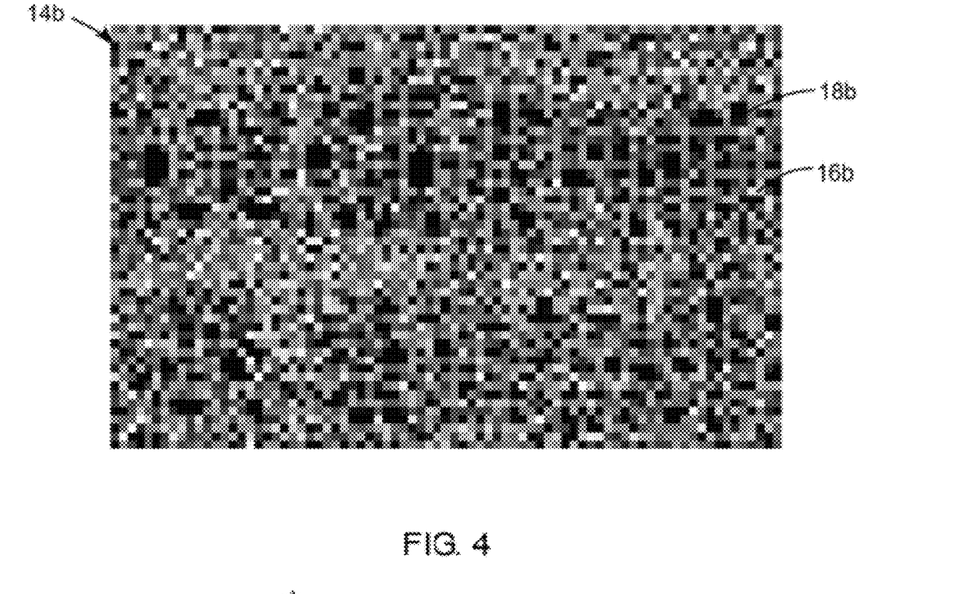
FIG. 4 is a view of the color gradient magnitude segmented into 1140 regions by a watershed transform process in accordance with the present disclosure.

FIG. 3 shows the color gradient magnitude 14b of the original image 14 with foreground regions 16b and background regions 18b. FIG. 4 shows the color gradient magnitude 14b segmented into 1140 regions by a watershed transform process. The segmented image 14c can have foreground regions 16c and background regions 18c. The foreground and background regions can be determined by comparing the color gradient magnitude of the region to a threshold value. A magnitude above or below the threshold value can identify the region as either foreground or background. Although this method has the advantage of being parameter-free, the method suffers from over-segmentation when applied to real images due to noise in the images that can inadvertently be identified as foreground or background regions and cause over-segmentation. Hence, as shown in FIG. 4, 1140 regions yields a noisy and cluttered image.

Figure 5:
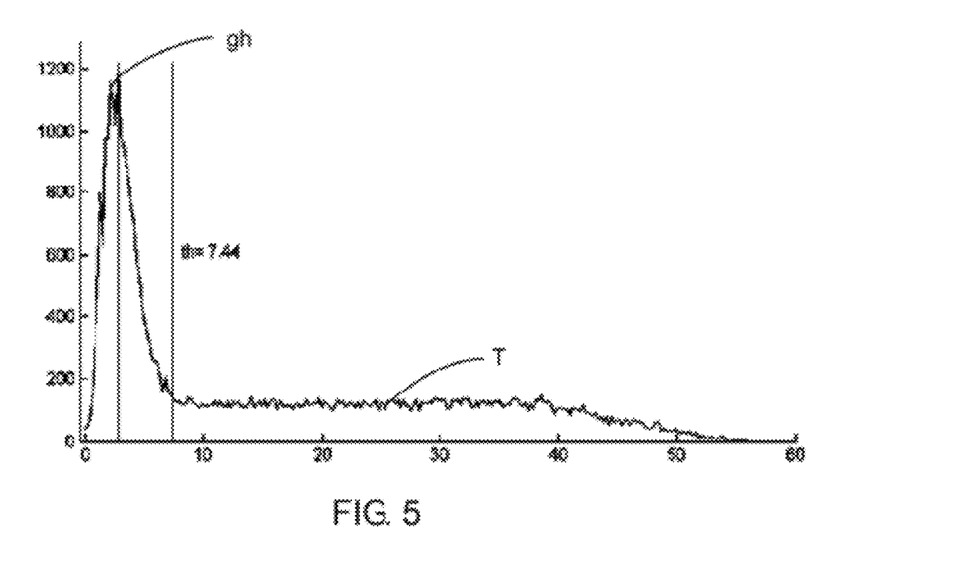
FIG. 5 is a view of a gradient histogram constructed by quantizing the color gradient magnitude of FIG. 4 into 256 levels in accordance with the present disclosure.

This over-segmentation issue can be solved by applying a non-linear, hard-thresholding to the color gradient magnitude as described in equation 1:

$$HT(g) = \begin{cases} 0, & g \leq th_g \\ g, & \text{otherwise} \end{cases} \quad [1]$$

where g is the color gradient magnitude and $th_g$ is a threshold value. The threshold value $th_g$ can be estimated based on the histogram of the gradient magnitude. FIG. 5 illustrates a gradient histogram gh[256] that can be constructed by quantizing gradient magnitude values into 256 levels and counting the number of values falling into individual bins. For the majority of documents, it can be assumed that the background regions are smooth and occupy the largest portion of a page of a document. This implies that the gradient magnitudes of background regions constitute the highest peak in the histogram gh. Based on this assumption, the threshold value $th_g$ can be set by the tail of the curve T. Additionally, it has been determined that a weighted average is more robust than a straightforward maxima search in locating the peak location.

The peak location can be found using equation [2], $$i_{peak} = \sum_{k=0}^{N} (k \cdot gh[k] \cdot w_k) \Big/ \sum_{k=0}^{N} (gh[k] \cdot w_k) \quad [2]$$

where $w_k$ is found by equation [3]:

$$w_k = \begin{cases} |gh[k] - gh[k+1]|, & k = 0 \\ |2gh[k] - gh[k-1] - gh[k+1]|, & \text{otherwise} \end{cases} \quad [3]$$

The tail location m of the histogram can then be searched by the criterion that three consecutive counts gh[m], gh[m+1], gh[m+2] are all below a set percentage of the histogram peak, $gh_{low} = \lambda \cdot gh_{peak}$, where λ can be set to 0.125.

Figure 6:
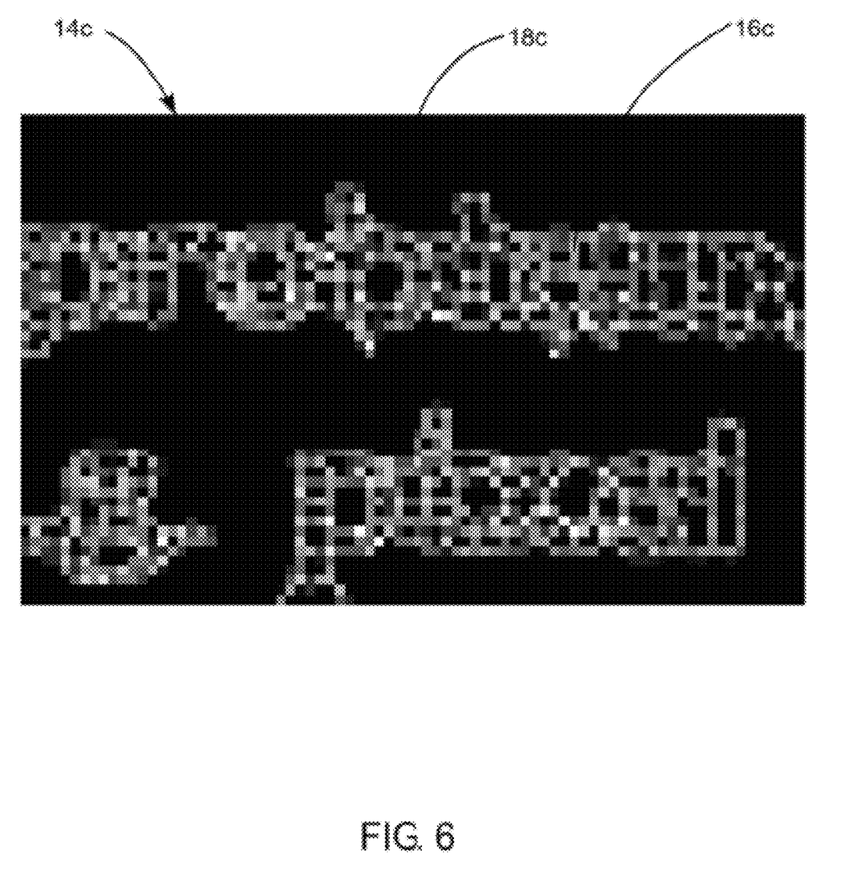
FIG. 6 is a view of the digitized image of FIG. 4 segmented into 230 regions by a noise threshold comparison technique in accordance with the present disclosure.

Comparing the segmented image to the threshold value as determined by the peak location of the histogram greatly reduces total over-segmentation. FIG. 6 shows the digitized image 14a having been segmented into 230 regions by the noise threshold comparison technique described above. The image 14d has foreground regions 16d and background regions 18d of sufficient number so as to clearly identify and segment the background regions from the foreground regions.

Once the initial segmented regions are determined, the program can cluster the regions into groups based on similar average color of the region. When the regions are clustered, the background region clusters can be identified based on pixel count, luminance, and spatial extent. It will be appreciated that background regions of documents statistically occupy more space of the page face than foreground regions and generally have a relatively consistent color. For this reason, the processor can be programmed to identify the segmented regions that have the same color and cover most of the document face as the background regions.

In general, the background of a document consists of multiple regions separated by foreground objects such as figures and graphics. The greater the number of background regions identified, the more accurate the construction of the complete background surface. Region clustering aids in background identification. Since color is a key characteristic of the background regions, the average color of a region can be used for the region clustering. In one embodiment, the QT clustering algorithm can be used because the QT clustering algorithm does not require a priori knowledge of the number of clusters.

The Euclidian color distance can be used as the distance measure of two regions. The duster diameter can be defined as the maximum color distance of all pairs in the cluster, with the threshold d set empirically. However, the computational complexity of the QT clustering can be too high to include all the regions. Since the size of background regions is conveniently quite large as a result of the noise thresholding, a very effective way to reduce the number of regions for the clustering is to only include regions with a pixel count greater than a threshold $N_{min}$, e.g., $N_{min}=\max\{width, height\}$.

The cluster of background regions can be selected by a metric taking into account pixel count, luminance, and spatial extent as described in equation [4].

$$\eta = N \cdot \bar{y} + k \cdot S \quad [4]$$

where N, $\bar{y}$, and S are pixel count, mean luminance, and the bounding box size of the cluster, respectively.

After the background regions have been identified, the program can use an iterative method to interpolate a complete background surface ($\beta_R, \beta_G, \beta_B$) using the method of potential surface with the background regions as a starting point. The iterative method can fix a value for pixels of the background regions. A four-neighbor residual value for each non-background pixel can be computed for each R, G, B channel. The four-neighbor residual value can be updated independently with each iteration. The iteration can be stopped when a sum of absolute residues drops below a threshold that is set proportional to the total number of non-background pixels, as described by equation [5]:

$$\varepsilon = \sum_{(x,y)\notin B} (|\mathfrak{R}_r(x, y)| + |\mathfrak{R}_g(x, y)| + |\mathfrak{R}_b(x, y)|), \quad [5]$$

where $\mathfrak{R}_r$, $\mathfrak{R}_g$, and $\mathfrak{R}_b$ are the residues of the three color channels. In practice, significantly faster convergence can be achieved by starting from a one-dimensional linear interpolated surface rather than from an arbitrary constant value.

Once the interpolation is complete, the program can scale up the estimated complete background surface to the resolution of the original image and normalize the image using equations [6]:

$$R(x,y)=255\cdot\tilde{R}(x,y)/\beta_R(x,y)$$

$$G(x,y)=255\cdot\tilde{G}(x,y)/\beta_G(x,y)$$

$$B(x,y)=255\cdot\tilde{B}(x,y)/\beta_B(x,y) \quad [6]$$

The background pixels can then be rectified to the estimated background surface such that substantially all of the background pixels have a color of approximately pure white with an R, G, B value of (255, 255, 255).

Final segmentation of the background and foreground regions of the image can then be accomplished by determining a Euclidian color distance for all pixels and comparing normalized pixels with a threshold color using equation [7].

$$d=\sqrt{(R-255)^2+(G-255)^2+(B-255)^2} \quad [7]$$

Pixels with a Euclidian color distance greater than a threshold value can be identified as a background pixel. The Euclidian color distance threshold value can be determined from a signal-to-noise ratio and predetermined application features.

Ideally, all background pixels would have a distance of zero and any pixel with a distance above zero should be identified as foreground. In practice, document images are degraded by noise and blurring. Therefore, the threshold value can be determined according to the signal-to-noise ratio and application features such as the desired character stroke width. Since the distance image is a scalar grayscale image with uneven illumination removed, global thresholding algorithms as known in the art can also be used. In one embodiment, threshold values in the range of 60 to 100 yield good results.

In summary, to normalize the image the program first estimates the background surface of the digitized image 14. Estimating the background surface can be accomplished by assuming the digitized image can be described by the color image formation model shown in equations [8]:

$$\tilde{R}(x,y)=\lambda_R(x,y)R(x,y),$$

$$\tilde{G}(x,y)=\lambda_G(x,y)G(x,y),$$

$$\tilde{B}(x,y)=\lambda_B(x,y)B(x,y), \quad [8]$$

wherein $(\tilde{R},\tilde{G},\tilde{B})$ is the observed image, (R,G,B) is the reflectance image, and $(\lambda_R,\lambda_G,\lambda_B)$ is the light surface. The light surface $(\lambda_R,\lambda_G,\lambda_B)$ can be estimated and then used to "normalize" the observed image to obtain the reflectance image described in equations [9].

$$R(x,y)=\tilde{R}(x,y)/\lambda_R(x,y),$$

$$G(x,y)=\tilde{G}(x,y)/\lambda_G(x,y),$$

$$B(x,y)=\tilde{B}(x,y)/\lambda_B(x,y), \quad [9]$$

If the original document background has a uniform reflectance then the light surface in background regions is proportional to the observed image. The partial surface data can then be interpolated to form a complete background surface ($\beta_R, \beta_G, \beta_B$).

Finally, a normalized image can be computed by equations [10]:

$$R(x,y)=255\cdot\tilde{R}(x,y)/\beta_R(x,y)$$

$$G(x,y)=255\cdot\tilde{G}(x,y)/\beta_G(x,y)$$

$$B(x,y)=255\cdot\tilde{B}(x,y)/\beta_B(x,y) \quad [10]$$

Since background pixels are normalized to (255,255,255) and the effect of uneven lighting on the foreground pixels are rectified, background and foreground pixels can be easily separated by a simple thresholding on the color distance between a pixel and (255,255,255).

Results of the programming can be stored by the processor 62 in the system memory 44. The system memory can be a volatile or non-volatile memory device as described above. The system memory can store the digital images from the camera and the results of the segmentation by the software program.

Figure 7:
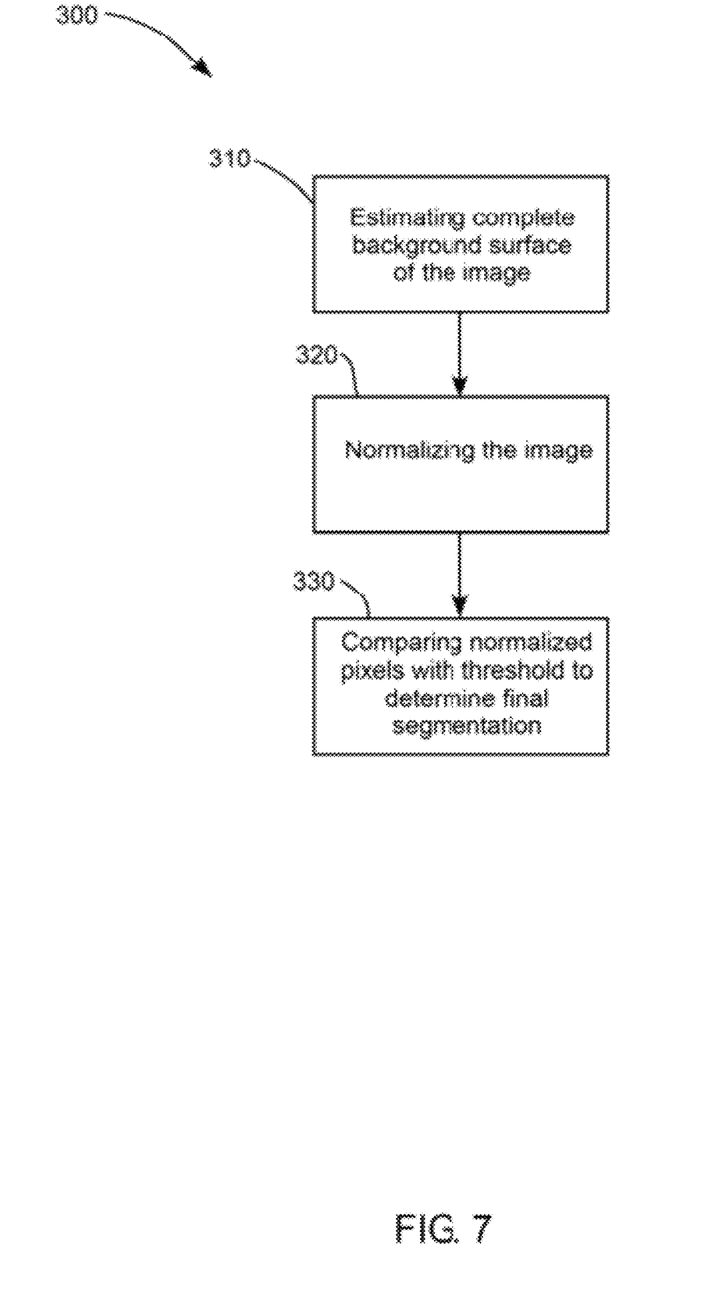
FIG. 7 is a flow chart of an embodiment of a method for segmenting foreground and background regions on a digitized image in accordance with the present disclosure.

Provided in FIG. 7 is a flow chart outlining the steps in one embodiment of a method for segmenting foreground and background regions on a digitized image. The method can be carried out by a computer having a processor and a system memory. The method, indicated generally at 300, includes estimating a complete background surface of the image, as indicated at 310. The pixels of the image can be rectified with the estimated background surface to normalize the image, as indicated at 320. Normalized pixels can be compared with a threshold color to determine a final segmentation of background regions, as indicated at 330.

The step of estimating a complete background surface can also include segmenting the image into initial regions. Background regions can be identified from the initial regions. Additionally, a complete background surface can be interpolated with the background regions.

The step of segmenting the image into initial regions can include downsizing and smoothing the image. A color gradient magnitude of the image can be computed. The color gradient magnitude of the image can be compared to a noise threshold, and a watershed transform can be applied to the thresholded color gradient magnitude to determine the initial segment regions.

The step of identifying background regions can include clustering regions together based on average color. A cluster of background regions can be selected based on pixel count, luminance, and spatial extent.

The step of interpolating a complete background surface can include using an iterative method to fix a value for pixels of the background regions. A four-neighbor residual value can be computed and updated for each non-background pixel for each R,G,B channel. The iteration can be stopped when a sum of absolute residues drops below a threshold that is set proportional to the total number of non-background pixels.

The step of comparing normalized pixels with a threshold color to determine a final segmentation can include determining a Euclidian color distance for all pixels, as indicated at 350. Pixels with a Euclidian color distance greater than a threshold value can be identified as background pixels, as indicated at 352. The Euclidian color distance threshold value can be determined from a signal-to-noise ratio as indicated at 354.

Figure 8:
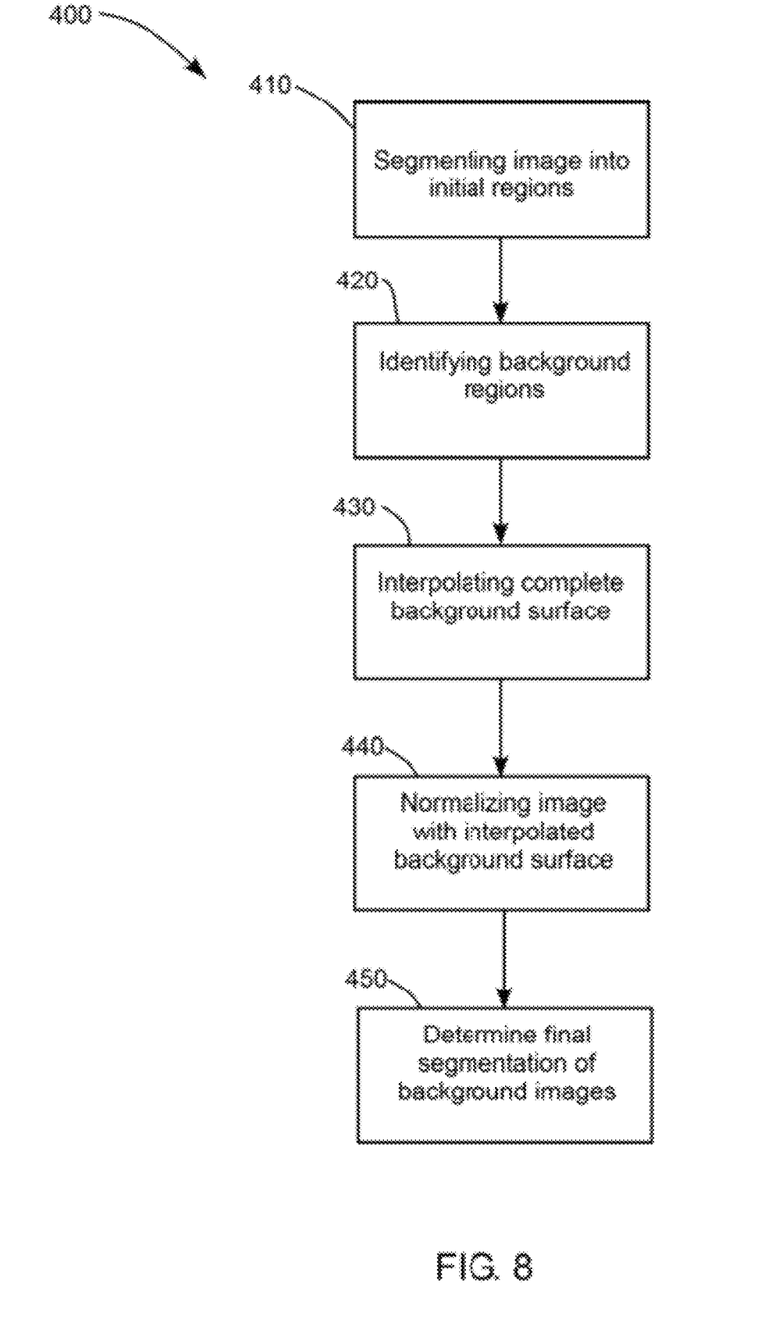
FIG. 8 is a flow chart of another embodiment of a method for segmenting foreground and background regions on a digitized image in accordance with the present disclosure.

Provided in FIG. 8 is a flow chart outlining the steps in another embodiment of a method for segmenting foreground and background regions on a digitized image. The method can be carried out by a computer having a processor and a system memory. The method, indicated generally at 400, can include segmenting the image into initial regions, as indicated at 410. Background regions can be identified from the initial regions, as indicated at 420. A complete background surface can be interpolated using the background regions, as indicated at 430. The image can be normalized with the complete background surface, as indicated at 440. Normalized pixels can be compared with a threshold color to determine a final segmentation of background regions, as indicated at 450.

The step of segmenting the image into initial regions can also include downsizing and smoothing the image. A color gradient magnitude of the image can be computed and compared to a noise threshold. A watershed transform can be applied to the thresholded color gradient magnitude to determine the initial segment regions.

The step of identifying background regions can also include clustering regions together based on average color. A cluster of regions can be selected and identified as background regions based on pixel count, luminance, and spatial extent.

The step of interpolating a complete background surface can also include using an iterative method to fix a value for pixels of the background regions. A four neighbor residual value can be determined and updated for each non-background pixel for each R,G,B channel. The iteration can be stopped when a sum of absolute residues drops below a threshold that is set proportional to the total number of non-background pixels.

The step of step of normalizing the image with the interpolated background surface can also include estimating a complete background surface from the downsized image. The downsized image can be scaled up to an original resolution, and all pixels of the image can be rectified with the estimated background surface such that all background pixels have a color of approximately pure white.

The step of comparing normalized pixels with a threshold color to determine a final segmentation can include determining a Euclidian color distance for all pixels. Pixels with a Euclidian color distance greater than a threshold value can be identified as background pixels. The Euclidian color distance threshold value can be determined from a signal-to-noise ratio and predetermined application.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for segmenting foreground and background regions on a digitized image, the method being carried out by a computer having a processor and a system memory, comprising:
    estimating a complete background surface of the image, by segmenting the image into initial regions, identifying background regions from the initial regions, and interpolating a complete background surface with the background regions;
    rectifying pixels of the image with the estimated background surface to normalize the image; and
    comparing normalized pixels with a threshold color to determine a final segmentation of background regions.

2. A method in accordance with claim 1, wherein segmenting the image into initial regions further includes:
    downsizing and smoothing the image;
    computing a color gradient magnitude of the image;
    comparing the color gradient magnitude of the image to a noise threshold; and
    applying a watershed transform to the thresholded color gradient magnitude to determine the initial segment regions.

3. A method in accordance with claim 1, wherein interpolating a complete background surface further includes:
    using an iterative method to fix a value for pixels of the background regions;
    computing and updating a 4 neighbor residual value for each non background pixel for each R,G,B channel; and
    stopping the iteration when a sum of absolute residues drops below a threshold that is set proportional to the total number of nonbackground pixels.

4. A method in accordance with claim 1, wherein comparing normalized pixels with a threshold color to determine a final segmentation further includes:
 determining a Euclidian color distance for all pixels;
 identifying pixels with a Euclidian color distance greater than a threshold value as a background pixel; and
 determining the Euclidian color distance threshold value from a signal-to-noise ratio and predetermined application features.

5. A method for segmenting foreground and background regions on a digitized image, the method being carried out by a computer having a processor and a system memory, comprising:
 segmenting the image into initial regions;
 identifying background regions from the initial regions, by clustering regions together based on average color, and selecting a cluster of background regions based on pixel count, luminance, and spatial extent;
 interpolating a complete background surface with the background regions;
 normalizing the image with the complete background surface; and
 comparing normalized pixels with a threshold color to determine a final segmentation of background regions.

6. A method in accordance with claim 5, wherein segmenting the image into initial regions further includes:
 downsizing and smoothing the image;
 computing a color gradient magnitude of the image;
 comparing the color gradient magnitude of the image to a noise threshold; and
 applying a watershed transform to the thresholded color gradient magnitude to determine the initial segment regions.

7. A method in accordance with claim 6, wherein normalizing the image with the interpolated background surface further includes:
 estimating a complete background surface from the downsized image;
 scaling up the downsized image to an original resolution; and
 rectifying all pixels of the image with the estimated background surface such that all background pixels have a color of approximately pure white.

8. A method in accordance with claim 5, wherein interpolating a complete background surface further includes:
 using an iterative method to fix a value for pixels of the background regions;
 computing and updating a 4 neighbor residual value for each non background pixel for each R,G,B channel; and
 stopping the iteration when a sum of absolute residues drops below a threshold that is set proportional to the total number of nonbackground pixels.

9. A method in accordance with claim 5, wherein comparing normalized pixels with a threshold color to determine a final segmentation further includes:
 determining a Euclidian color distance for all pixels;
 identifying pixels with a Euclidian color distance greater than a threshold value as a background pixel; and
 determining the Euclidian color distance threshold value from a signal-to-noise ratio and predetermined application features.

10. A system for segmenting foreground and background regions on a digitized image, comprising:
 a digital duplicator configured to digitally reproduce a document;
 a computer, having a processor and a system memory for receiving digital reproductions from the duplicator;
 a software program, stored on tangible computer-readable storage memory, executable by the processor to perform the steps of:
  segmenting the image into initial regions;
  identifying background regions from the initial regions;
  interpolating a complete background surface with the background regions to yield an estimated background surface;
 normalizing the image with the estimated background surface; and
 comparing normalized pixels with a threshold color to determine a final segmentation of background regions.

11. A system in accordance with claim 10, wherein the digital duplicator is a digital camera and the digitized image is a digital photograph of a document.

* * * * *